March 17, 1931. A. F. MASURY 1,796,382
INCLOSED CHAIN DRIVE
Filed Feb. 16, 1929
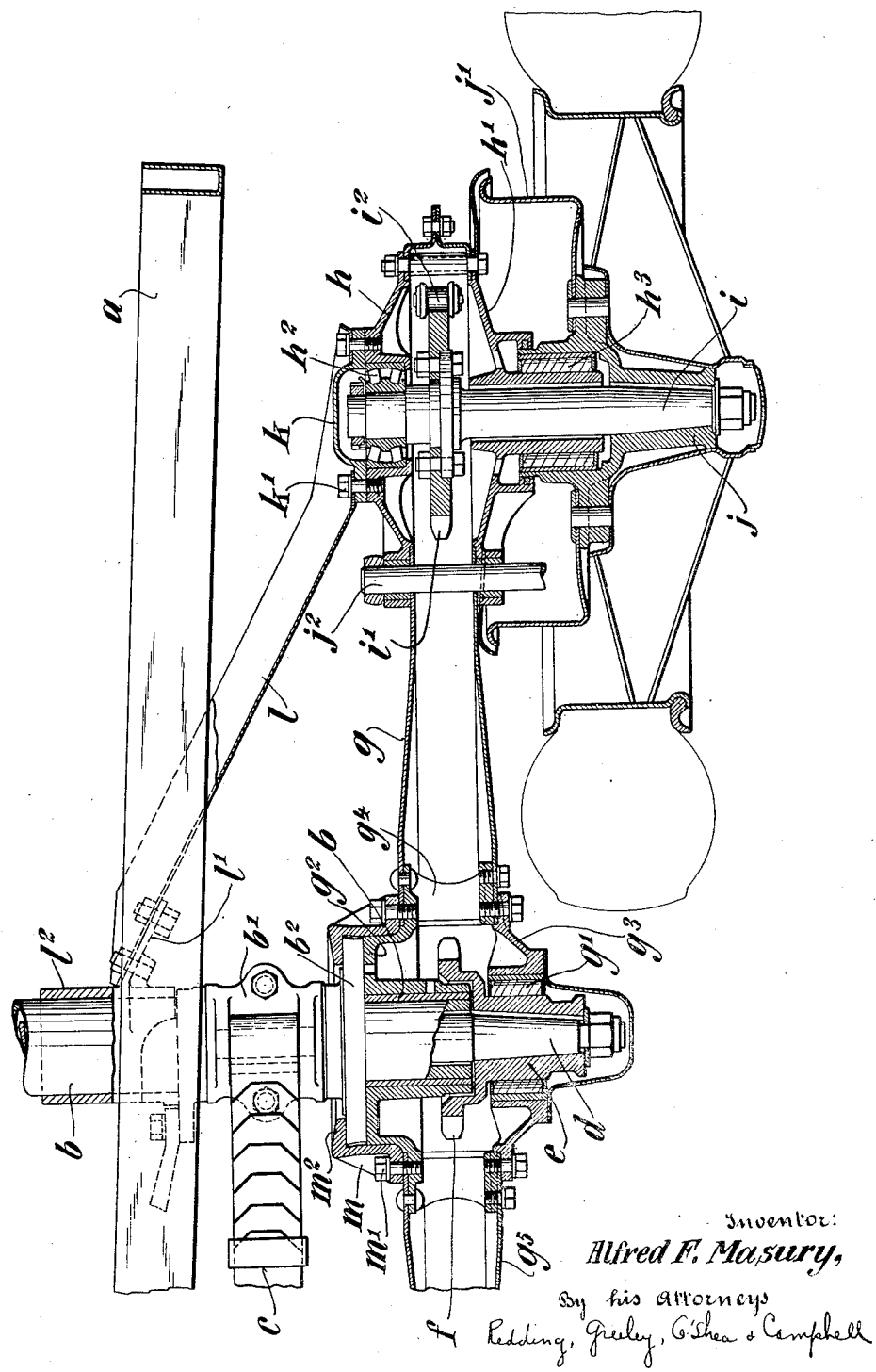
Inventor:
Alfred F. Masury,
By his attorneys
Redding, Greeley, O'Shea & Campbell Patented Mar. 17, 1931

1,796,382

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

INCLOSED CHAIN DRIVE

Application filed February 16, 1929. Serial No. 340,465.

The present invention relates to four-wheel drives including a driving truck at the rear of a vehicle frame and embodies, more specifically, an improved mounting for a truck of the above character which utilizes an inclosed chain drive to transmit power from the live axle sections to the independently mounted jack shafts carried by the truck.

In certain forms of service, it is highly desirable to increase the traction available in a given standard vehicle and decrease the load per wheel. Forms of drives have been suggested embodying four driving wheels but these require a considerable amount of redesigning of the chassis. It is very desirable to provide a means for transforming a standard chassis, having two rear driving wheels, into a chassis having four rear driving wheels, such transformation being accomplished quickly and without redesigning the parts thereof.

An object of this invention is to provide a four-wheel drive capable of being mounted upon the conventional axle housing and live axles embodied in a conventional vehicle chassis.

A further object of the invention is to provide a construction of the above character which may be applied to, or removed from, such conventional chassis without requiring the alteration of any part, the resulting four-wheel drive being strongly constructed and easily mounted and dismounted.

Further objects will appear as the invention is described in greater detail in connection with the accompanying drawing, wherein the single figure is a plan view partly in section showing a preferred form of the invention.

Referring to the above drawing, $a$ designates the frame member of a conventional vehicle chassis upon which an axle housing $b$ is mounted through a spring $c$ of cantilever construction. This spring may be secured to the axle housing by bracket $b'$ in the usual manner, the axle housing being formed with an annular flange $b^2$ for a purpose to be described hereinafter.

Within the axle housing, a live axle section $d$ is provided, a collar $e$ being secured thereto and formed with a sprocket wheel $f$. Upon the axle housing $b$ and external periphery of hub $e$, a pivoting housing $g$ is mounted, bearings $g'$ being carried between the external periphery of hub $e$ and the housing $g$. The wheel carrier or housing $g$ is formed of inner and outer hub portions $g^2$ and $g^3$, respectively, spacing members $g^4$ being provided to secure the two together in a well known manner.

Side wall $g^5$ are mounted upon the hub sections $g^2$ and $g^3$ and, at their ends, carry inner and outer supporting plates $h$ and $h'$, respectively. A jack shaft $i$ is carried by these plates through suitable bearings $h^2$ and $h^3$, respectively. Sprocket wheel $i'$ is mounted on the jack shaft to receive the links $i^2$ of a chain connecting the sprocket wheels $i$ and $f'$. The wheel hub $j$ is mounted on the extremity of jack shaft $i$ and carried by the plate $h'$ through bearing $h^3$. The usual brake drum $j'$ is secured to the wheel and a brake operating shaft $j^2$ carried in the housing and plates $h$ and $h'$.

A cap $k$ serves as a closure for the plate $h$ and bearing $h^2$, being secured thereto by bolts $k'$. Under these bolts a radius rod $l$ is secured, the other end of the rod being secured to a bracket $l'$ formed on a sleeve $l^2$ which is rotatably mounted upon the axle housing $b$. This rod and associated parts serve as a reinforcing element to resist the lateral stresses impressed upon the housing during turning of the vehicle.

In order to secure the housing $g$ to the axle housing $b$, an annular bracket $m$ is provided. This bracket is secured to the plate $g^2$ by means of bolts $m'$ and is formed with an inwardly extending flange $m^2$ to engage the annular flange $b^2$. In this manner, the housing $g$ is carried on the axle housing with capacity for pivotal movement, the annular bracket $m$ preventing axial displacement thereof.

While the invention has been described in connection with the specific construction shown in the accompanying drawing, it is not to be limited, save as defined in the appended claims.

I claim as my invention:

1. In a drive for vehicles having an axle housing, a live axle section and a driving means carried thereby, a flange on the axle housing, a carrier pivoted on the housing and adapted to mount a plurality of wheels, an inner hub portion on the carrier forming a bearing surface, an annular bracket on the carrier secured to the inner hub portion and receiving the flange between the bracket and hub portion, a cover plate for the wheel mounting, and a radius rod secured to the cover plate and rotatably secured to the axle housing.

2. In a drive for vehicles having an axle housing, a live axle section and a driving means carried thereby, a flange on the axle housing, a carrier pivoted on the housing and adapted to mount a plurality of wheels, an inner hub portion on the carrier forming a bearing surface, an annular bracket on the carrier secured to the inner hub portion and formed with a radial inwardly extending flange, the first flange being received between the last named flange and the hub portion, means to drive the wheels from the driving means, and a radius rod extending between one of the wheel mountings and the axle housing.

This specification signed this 13th day of February, A. D. 1929.

ALFRED F. MASURY.